United States Patent
Gummadi et al.

(10) Patent No.: US 10,911,998 B2
(45) Date of Patent: Feb. 2, 2021

(54) SCAN OPTIMIZATION IN ENHANCEMENT MACHINE TYPE COMMUNICATION DEVICES

(71) Applicant: QUALCOMM Incorporated, San Diego, CA (US)

(72) Inventors: Bapineedu Chowdary Gummadi, Hyderabad (IN); Manikantha Desetty, Hyderabad (IN); Balaji Kannan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/280,396

(22) Filed: Feb. 20, 2019

(65) Prior Publication Data
US 2020/0267611 A1 Aug. 20, 2020

(51) Int. Cl.
*H04W 4/00* (2018.01)
*H04W 36/00* (2009.01)
(Continued)

(52) U.S. Cl.
CPC ... *H04W 36/0094* (2013.01); *H04W 36/0022* (2013.01); *H04W 36/0061* (2013.01); *H04W 36/0066* (2013.01); *H04W 36/0088* (2013.01); *H04W 36/20* (2013.01); *H04W 36/30* (2013.01); *H04W 52/08* (2013.01); *H04W 52/241* (2013.01)

(58) Field of Classification Search
None
See application file for complete search history.

(56) References Cited

U.S. PATENT DOCUMENTS

2014/0148170 A1* 5/2014 Damji ............... H04W 48/16 455/437
2015/0271721 A1 9/2015 Venkatachari et al.
(Continued)

FOREIGN PATENT DOCUMENTS

EP 3280189 A1 2/2018

OTHER PUBLICATIONS

International Search Report and Written Opinion—PCT/US2020/019041—ISA/EPO—dated May 28, 2020.
(Continued)

*Primary Examiner* — Phuongchau Ba Nguyen
(74) *Attorney, Agent, or Firm* — Arent Fox, LLP; Nerrie M. Zohn

(57) ABSTRACT

Mobile communication devices may use too much power and/or take too much time when camping on a particular mobile communication network. An apparatus may implement functions that may decrease power usage and/or decrease time usage. The apparatus may be a UE configured to measure energy levels for each frequency channel of a set of frequency channels in a frequency band to determine measured energy levels. The apparatus may also be configured to determining whether a first cell that operates using a first RAT is detected on a frequency channel of the set of frequency channels based on the measured energy levels. Additionally, the apparatus may be configured to search for a second cell that operates using a second RAT, when no cell for the first RAT is detected on the set of frequency channels, wherein the UE searches for the second cell using the measured energy levels.

37 Claims, 8 Drawing Sheets

(51) Int. Cl.
*H04W 36/20* (2009.01)
*H04W 36/30* (2009.01)
*H04W 52/08* (2009.01)
*H04W 52/24* (2009.01)

(56) References Cited

U.S. PATENT DOCUMENTS

2016/0073417 A1    3/2016  Sebeni et al.
2016/0337946 A1*  11/2016  Kim ..................... H04W 8/183

OTHER PUBLICATIONS

Nokia, et al., "Power Efficient Mechanism for Inter RAT Cell Selection", 3GPP Draft, 3GPP TSG RAN WG2 Meeting #103bis, R2-1814414, -NB-IOT-Inter-Rat-Cell-Selection », 3rd Generation Partnership Project (3GPP), Mobile Competence Centre, 650, Route Des Lucioles, F-06921 Sophia-Antipolis Cedex, France, vol. RAN WG2, No. Chengdu, China, Oct. 8, 2018-Oct. 12, 2018, Sep. 27, 2018 (Sep. 27, 2018), XP051523845, 2 pages, Retrieved from the Internet: URL: http://www.3gpp.org/ftp/tsg%5Fran/WG2%5FRL2/TSGR2%5F103bis/Docs/R2%2D1814414%2Ezip. [retrieved on Sep. 27, 2018] p. 1.

* cited by examiner

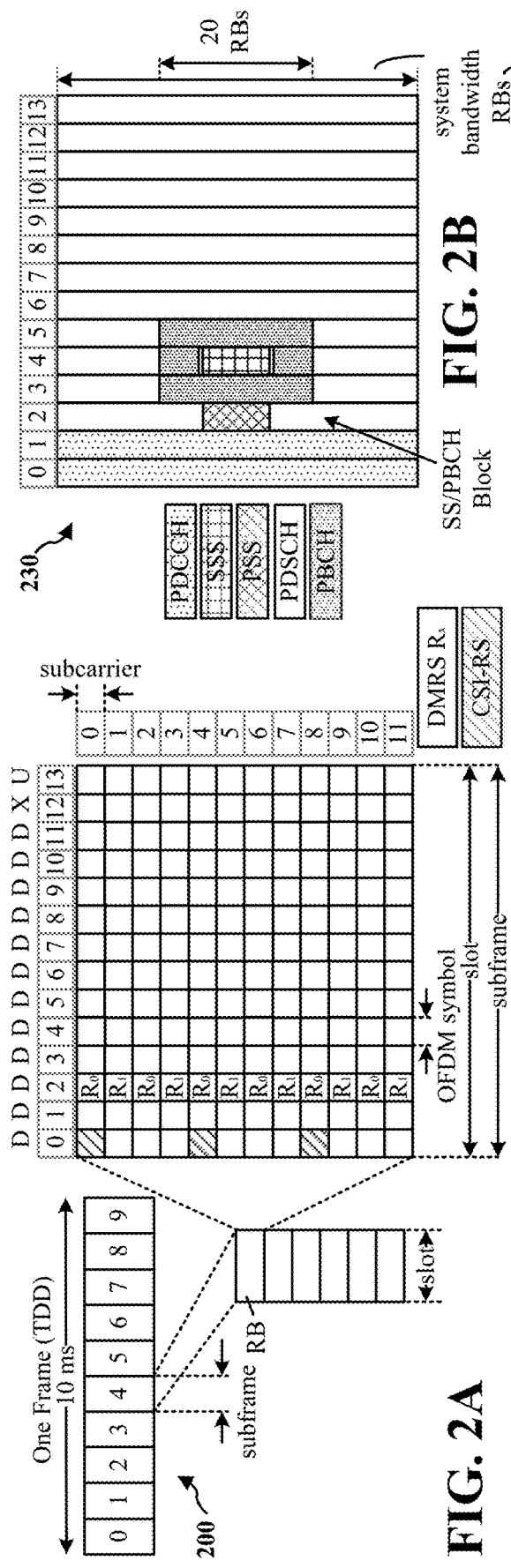
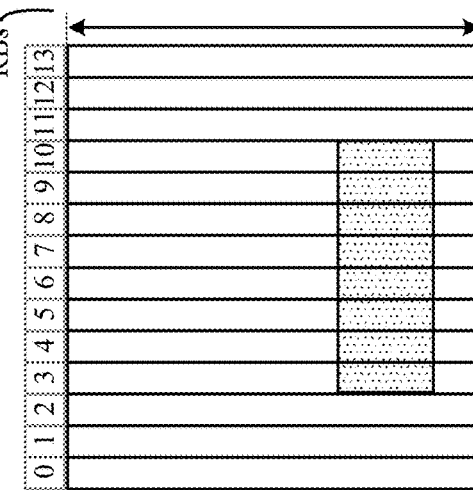
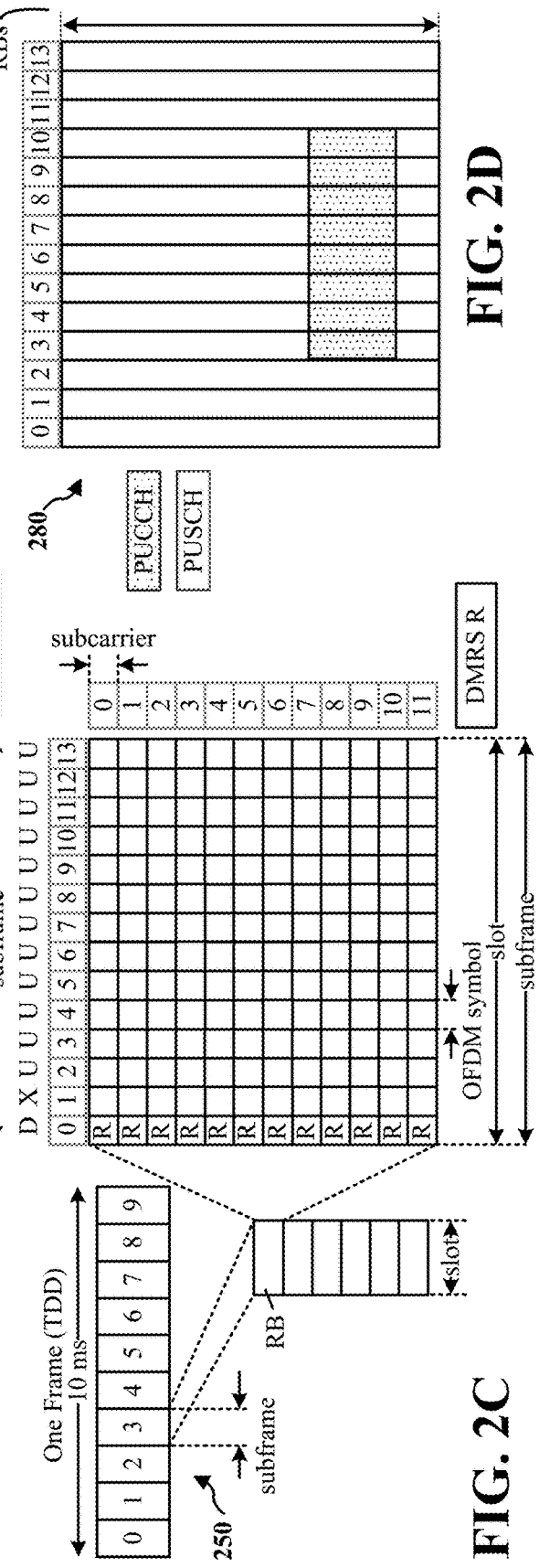
FIG. 2A   FIG. 2B   FIG. 2C   FIG. 2D

SCAN OPTIMIZATION IN ENHANCEMENT MACHINE TYPE COMMUNICATION DEVICES

BACKGROUND

Technical Field

The present disclosure relates generally to communication systems, and more particularly, to a scan optimization.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Mobile communication devices may camp on a particular network, e.g., 3G, 4G, 5G/NR, or other network. In other words, a mobile communication devices may connect to a particular network for a period of time. Such a mobile communication device may use both a first RAT, e.g., using Cat-M, and a second RAT, e.g., using Narrowband Internet of Things (NB-IoT). The mobile communication device may use too much power and/or take too much time when camping on a particular network. Accordingly, it may be advantageous to implement functions that may decrease power usage and or reduce the amount of time for a UE that is capable of using multiple RATs to find a cell.

In an aspect of the disclosure, a method, a computer-readable medium, and an apparatus are provided. The apparatus may be a UE configured to measure energy levels for each frequency channel of a set of frequency channels in a frequency band to determine measured energy levels. The apparatus may also be configured to determining whether a first cell that operates using a first RAT is detected on a frequency channel of the set of frequency channels based on the measured energy levels. Additionally, the apparatus may be configured to search for a second cell that operates using a second RAT, when no cell for the first RAT is detected on the set of frequency channels, wherein the UE searches for the second cell using the measured energy levels.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
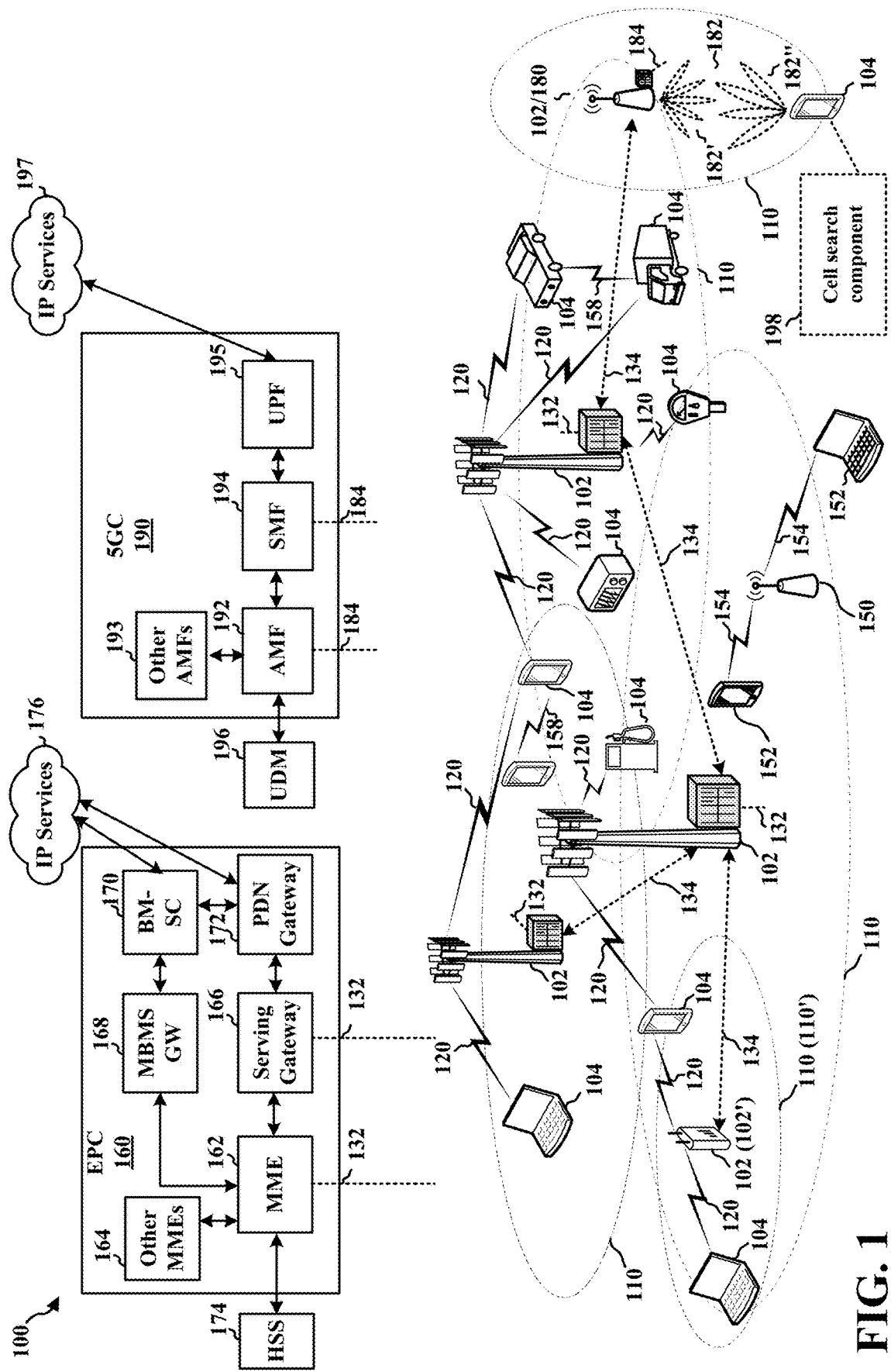
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell), and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a cell search component 198 that is configured to search for a second cell that operates using a second RAT using measured energy levels (198). For example, the UE 104 may measure energy levels for each frequency channel of a set of frequency channels in a frequency band to determine measured energy levels. The UE 104 may determine whether a first cell that operates using a first RAT is detected on a frequency channel of the set of frequency channels based on the measured energy levels. The UE 104 may search for a second cell that operates using a second RAT, when no cell for the first RAT is detected on the set of frequency channels, wherein the UE searches for the second cell using the measured energy levels.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios), or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ. 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
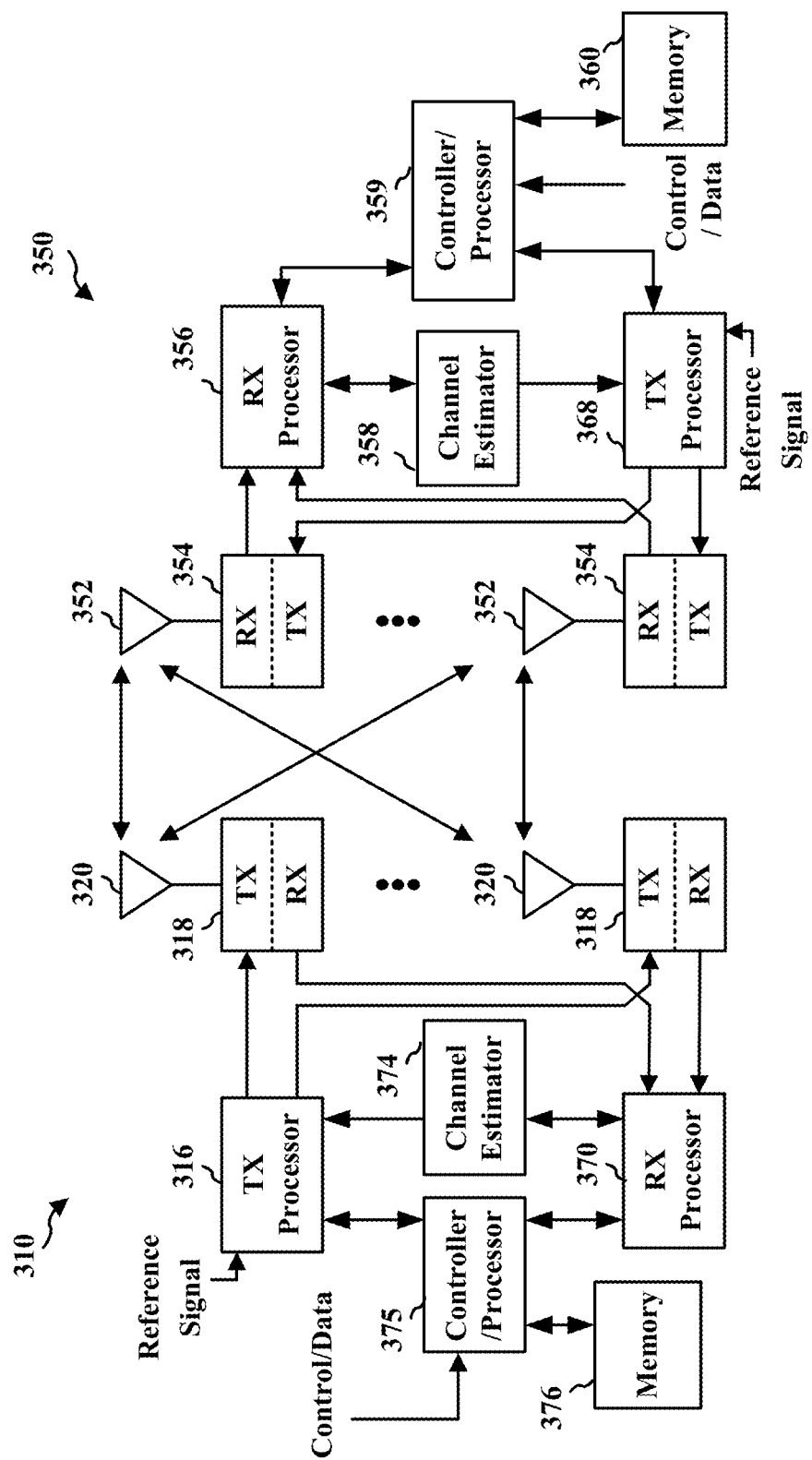
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Category M (Cat-M) for UEs has been introduced with the following goals: (1) lower cost, (2) lower power consumption, and (3) coverage enhancement (CE). Cat-M. The narrowband internet of things (NB-IoT) may provide a narrowband alternative to Cat-M. Thus, Cat-M and NB-IoT may both be targeted to low power and/or low throughput devices such as IoT devices, water/electricity meters, wearables, or other low power and/or low throughput devices.

Cat-M devices may operate in the same operating frequencies as LTE. For example, a part of the LTE frequency band, such as a 1.4 MHz band, may be allocated to Cat-M. NB-IoT may include any of three modes of operation: (1) the in-band mode of operation, (2) the guard band mode of operation, and/or (3) the standalone mode of operation. For the in-band mode of operation and the guard band mode of operation an NB-IoT device may operate in same frequency as LTE The NB-IoT device may operate in a Global System for Mobile Communications (GSM) frequency for standalone mode.

Because Cat-M does not need an infrastructure change, many operators are actively supporting and enabling both Cat-M along with NB-IOT on the IOT devices. Accordingly, operators would like to have a flexibility to have both Cat-M and NB IOT in same device and switch between the RATs based on the need. Such a device may switch between the RATs based on the needs of/presence of cells for Cat-M and NB-IoT. Cat-M may be used in wide coverage areas whereas NB IoT may be used in deep coverage areas.

Currently, when a device has the ability to use both Cat-M and NB-IoT, the Cat-M frequencies and the NB-IoT frequencies may be scanned sequentially, one after the other. A Cat-M scanning time may be similar to a legacy LTE scanning time, e.g., a few seconds per band. NB-IoT scanning time may take much longer, e.g., more than 8 minutes per band because of the 100 KHz raster limitation in NB-IoT. Eight minutes may lead to a scan time that is considered too long by device users.

Because Cat-M and NB-IoT do not support inter-RAT operations, switching between the Cat-M and NB-IoT may happen only when the UE experiences an Out-of-Service condition. In a Cat-M and NB-IoT system, when a Cat-M cell is the excepted cell to camp and when NB scan is ongoing, a device may take an ample amount of time to camp. In such a case, when one RAT goes out of service, another RAT may again perform a scan for camping which consumes time and power.

An issue may arise with devices not able to camp on Cat-M or camping on Cat-M in a manner that takes too much time, e.g., because a UE is stuck with an NB-IoT scan for minutes. The long scanning time not only leads to a delay in camping on, e.g., a Cat-M cell, but also consumes an undesirable amount of power. Accordingly, the systems and methods described herein propose multiple aspects that may be used to address the issues described above. The systems and methods described herein may reduce the time for a cell search in a Cat-M and NB-IoT device and/or reduce the power for a cell search in the Cat-M and NB-IoT device.

As described above, part of the LTE frequency band may be allocated to Cat-M. For the in-band mode of operation and the guard band mode of operation, the NB-IoT may operate in the same LTE frequency band. The systems and methods described herein may be applicable for NB-IoT in-band and guard band modes of operation because NB-IoT in-band and guard band modes may use the same frequency band, e.g., LTE frequency bands, as Cat-M. Accordingly, the systems and methods described herein may be applied to NB-IoT in-band and guard band modes while generally not being applied to NB-IoT standalone mode because NB-IoT standalone mode uses different frequencies, e.g., GSM, as discussed above.

In a first proposal, a Cat-M and NB scan may be performed. In an aspect, an energy scan may be performed including energy detection and computation at each frequency, e.g., each E-UTRA Absolute Radio Frequency Channel Number (EARFCN). Energy detection and computation at each frequency may, in some cases, be the part of scanning that consumes a significant amount of time and power. Accordingly, aspects are presented herein to reuse information from one scan for attempting to detect a cell for more than one RAT. For example, the information may be used for both the Cat-M scan and to assist the NB scan, e.g., leading to savings for power and time.

In an aspect, an energy metric, determined as part of taking measurements for one RAT, may also be used to attempt to detect a cell for another RAT. For example, the energy metric determined while taking measurements for one RAT may be used for another RAT because, in some examples, both RATs may use the same frequency band. For example, Cat-M and NB-IoT may be deployed in the same bands.

In an aspect, energy may be computed for each communication system channel, e.g., per EARFCN, i.e., 100 KHz Raster. In an aspect with a Cat-M cell having priority over NB-IoT, measurements for a Cat-M cell may be performed first. For a 20 MHz Band, the number of energy computations may be 200 given the 100 KHz Raster. When the energy detected is above a threshold for each of the 200 computations, a list of channels (EARFCNs) with good signal strength may be prepared. The list of channels (EARFCNs) with good signal strength may then be used for cell detection. In an aspect, an energy metrics for NB-IoT may be determined for a case when no Cat-M cell is found. Scanning for the NB-IoT may then be performed using the earlier set of measurements. Thus, a device may avoid re-measuring the energies in order to perform an NB-IoT scan. Avoiding re-measurement may save time, power, or both time and power.

Figure 4:
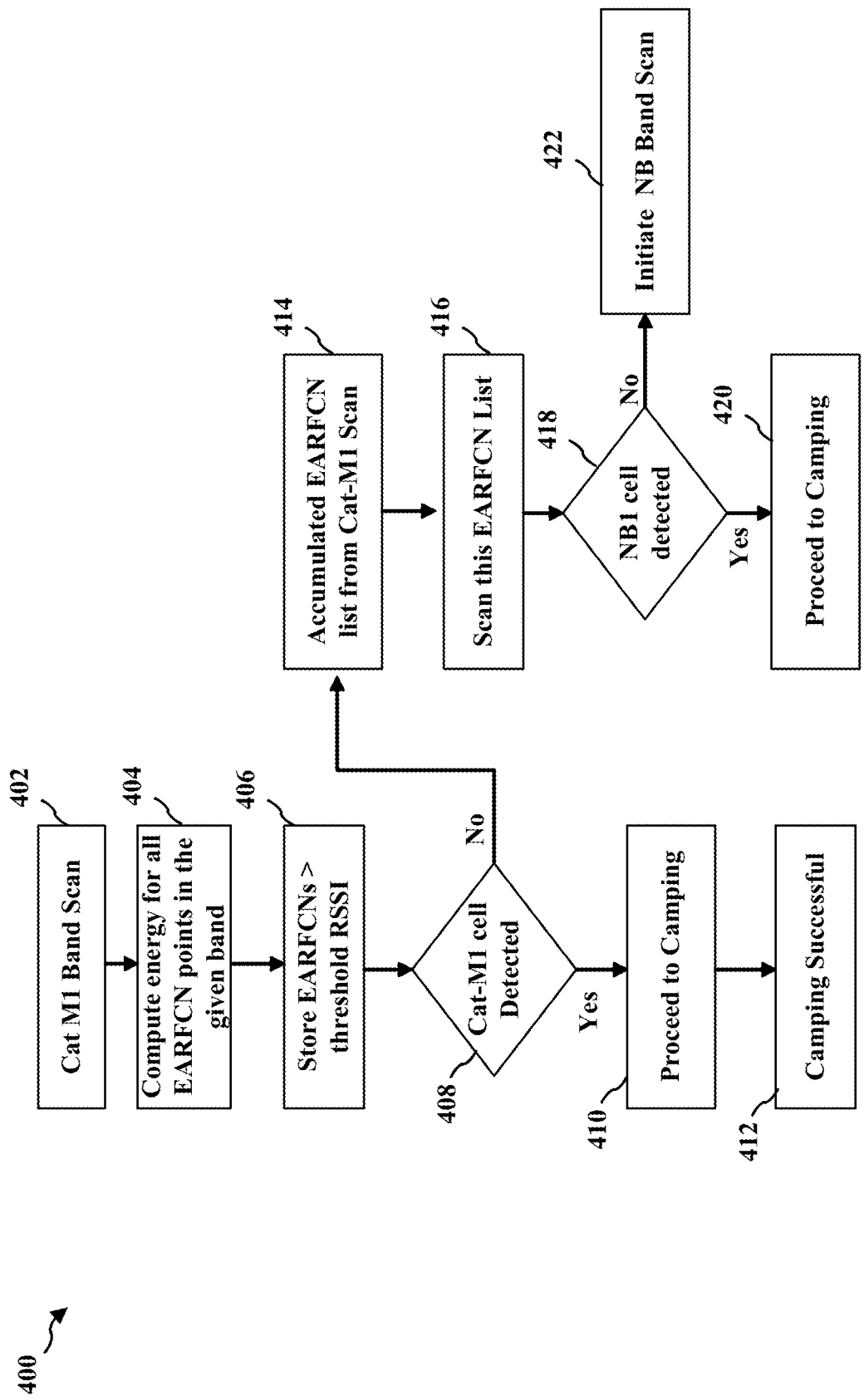
FIG. 4 is a flowchart of a method of wireless communication.

Referring no to FIG. 4, a flowchart 400 of a method of wireless communication is described. The method may be performed by a UE (e.g., the UE, the apparatus 702/702'). At 402, the UE may perform a Cat-M band scan. The band scan may take energy measurements across the Cat-M frequency band. For example, for a 20 MHz band with a 100 KHz raster, the number of energy measurements may be 200 (20 MHz/100 KHz).

At 404, the UE may compute energy for all the channels (e.g., EARFCN) points in the band being scanned. The band scan may take energy measurements across the Cat-M frequency band. For example, for the 20 MHz band discussed above, with the 100 KHz raster, the number of computations may also be 200.

At 406, the UE may store channels (e.g., EARFCN) with a computed energy value above a threshold. For example, each computed energy value may be compared to a threshold. Any channel associated with any energy value that is above the threshold may be stored in a memory or other data storage component or device. Thus, a list of EARFCNs having a good signal strength may be prepared and saved for later use.

At 408, the UE may detect a Cat-M cell, e.g., when the UE is in proximity to the Cat-M cell such that signals received from the Cat-M cell are received with signal power above the threshold. The measurement may be added to the list of EARFCNs, e.g. and stored for later use. For example, the UE may detect the Cat-M cell based on the stored channel or channels. A stored channel may indicate a channel being used by the Cat-M cell. In another example, the determination may be made directly based on the measurements as the measurements are taken. A channel having a measurement above the threshold may indicate a channel in use by the Cat-M cell.

At 410, when a Cat-M cell is detected (408), the UE may proceed to camping on the Cat-M cell. At 412, the UE may successfully camp on the Cat-M cell. For example, the UE may generally successfully camp on the Cat-M cell after such a cell is detected. In some cases, however, camping may be unsuccessful. For example, when a UE is moving away from the Cat-M cell or travels behind obstructions after detection such that communication with the Cat-M cell is no longer possible or the signals fall below the threshold shortly after detection, e.g., between 408 and 410 or 412.

At 414, the UE may process the accumulated channels list (e.g., the stored channel/EARFCNs that are greater than the threshold). For example, at 416, the UE may scan the channel/EARFCN list for narrow band signals.

At 418, the UE may, when a narrow band signal is detected, proceed to camping on that narrowband signal, e.g., an NB-IoT RAT (420). When no narrowband signal is detected at 418, the UE may proceed to initiate, and proceed to perform, a narrowband scan at 422. The UE may detect an NB-IoT cell and proceed to camp on the cell.

Figure 5:
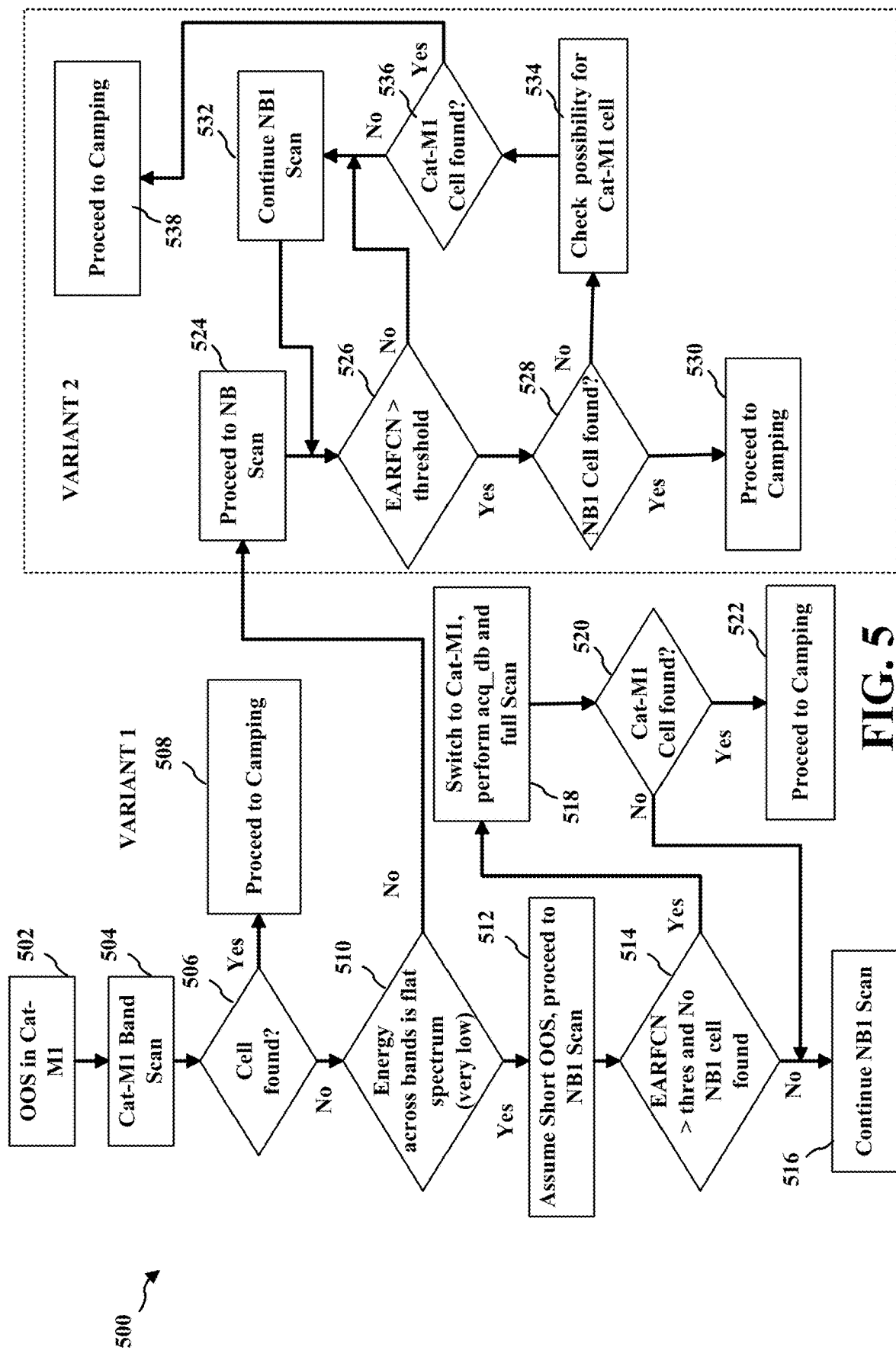
FIG. 5 is a flowchart of a method of wireless communication.

FIG. 5 is a flowchart 500 of a method of wireless communication. The method may be performed by a UE (e.g., the UE, the apparatus 702/702'). In a second proposal, the UE may determine whether it is in a short time out-of-service (OOS) condition to help the UE determine how to search for a cell among multiple RATs. The scan time per band in Cat-M may be a couple of seconds, whereas the scan time for NB may be more than 8 minutes per band. Accordingly, it may be advantageous to decrease the need to run both scans in an independent manner. Aspects presented herein provide a way to search for a cell in a more time and energy efficient manner.

A UE that is operating using Cat-M may lose service temporarily. For example, a UE that is using Cat-M may lose service temporarily when the UE is in an elevator, tunnel, basement, or other scenarios that impact wireless transmissions. The UE may not be able to find the Cat-M cell. Accordingly, the UE may attempt to move to an NB-IoT scan to find an NB-IoT cell. The NB-IoT scan may take more than 8 minutes per band alone, however. Accordingly, the UE may be stuck performing the NB-IoT scan for a large amount of time, e.g., even after the UE has exited the elevator/tunnel/basement, because of the number of bands to scan for NB-IoT before the UE may rescan for a Cat-M cell.

In an aspect, while performing a narrowband scan, when the RAT priority is Cat-M, and from the UE identifies a possible short OOS condition (above scenario), when a suitable energy is found on a raster during NB-IoT scan, then a device may immediately check for the presence of Cat-M cell on the corresponding channel (e.g., EARFCN). FIG. 5 includes aspects relating to two variations. A corresponding procedure may be performed when NB1 is the priority, and the Cat-M scan is ongoing.

The second proposal may have two variants (variant 1 and variant 2). In a first variant of the second proposal (variant 1), energy detected at a channel (e.g., EARFCN), during the NB scan, which meets a certain threshold, may indicate that the device is back in the service region. Accordingly, the device may perform an initial scan of the Cat-M band, e.g., if a NB cell is not found at the frequency. In the second variant, when an OOS condition is not indicated, the UE may check for possible Cat-M cell on that particular channel (e.g., EARFCN) before returning to the NB scan.

The initial scan may provide the energy computations on each raster (EARFCN) for the band. From the scan results, a device may estimate if the scenario is a possible short time OOS. The short time OOS may be when the energies across the band are very low (e.g., a flat spectrum). The device, e.g., UE, may then proceed to the NB-IoT search. When there is energy detected at an EARFCN during the NB scan which is more than a certain threshold, the presence of the energy may indicate the device might be back in the service region. Accordingly, the device may move to Cat-M and perform an Acquisition Database (Acq-dB) scan followed by a full scan. The Acq-dB may be a database of previously detected cells. The Acq-dB may be used to prioritize frequency search, based on the order of the frequency and/or EARFCN in the Acq-dB. Unlike the Acq-dB scan that may only scan prior successful bands, the full scan may generally cover all possible bands. The data in the Acq-dB may be accessed in first-in, first-out (FIFO) order.

A device implementing the second variant of the second proposal (variant 2) described herein may, during a Cat-M scan, determine when no cell is found. The device may also determine that the energies measured do not indicate short-time OOS. The device may then continue to perform the NB-IoT scan. When sufficient energy measurements are found on any channel (e.g., EARFCN) to indicate a potential cell, but NB-IoT cell is not detected, the device may check for a possible Cat-M cell on that channel (e.g., EARFCN). When no Cat-M cell found, the device may continue to perform the NB-IoT scan.

The systems and methods described herein may provide a time savings relative to devices that do not implement the systems and methods described herein. For example, a single band may take approximately 8 minutes for NB-IoT scanning. In contrast, Cat-M takes an average of 2.5~3 seconds for a single band. The power consumed for the energy spectrum may be undesirably high for devices taking the longer period for NB-IoT scanning.

FIG. 5, illustrates, at 502, a UE in Cat-M may go out of service. For example, the UE may no longer be within range of the Cat-M base station, e.g., due to location on an elevator, in a tunnel, in a basement, etc. Accordingly, at 504, the UE may perform a Cat-M band scan. When the UE finds a cell (506) the UE may proceed to camp on that cell at 508.

At 506, when no Cat-M cell is found, the UE may determine if the energy across the bands are low, e.g., a flat spectrum (at 510). For example, the UE may determine whether there are indications that the UE is in a temporary OOS condition. At 512, when the bands are a flat spectrum, the UE may assume a short OOS and proceed to a narrowband scan.

If a channel's (EARFCN) energy measurements are not greater than the threshold (indicating absence of a cell) or a narrowband cell is found on the channel (at 514), the narrowband scan may continue (at 516).

However, at 514, if the channels (EARFCN) energy measurements are greater than the threshold and no narrowband cell is found, the UE may switch to Cat-M and perform an Acq-dB scan and a full Cat-M scan (at 518). When no Cat-M cell is found (at 520), the UE may continue the narrowband scan (at 516). When a Cat-M cell is found (at 520), the UE may proceed to camp on the Cat-M cell (at 522).

When energy is not flat across the spectrum (at 510), the lack of flat energy across the spectrum may indicate that the inability to find a Cat-M cell is not due to a short OOS condition. Thus, the UE may, at 524, proceed to a narrowband scan. When the energy in a channel (EARFCN) is greater than a threshold (at 526), the UE may first check for an NB cell, e.g., an NB-IoT cell. If a narrowband cell is found (at 528), the UE may proceed to camping at 530.

However, at 526, when the power in a channel (EARFCN) is not greater than a threshold, the scan may continue (at 532), until an energy is measured that meets the threshold.

At 528, when the measured energy meets the threshold yet no narrowband cell is found, the UE may check for a Cat-M cell at that frequency, at 534. When a Cat-M cell is not found at that frequency (at 536), the NB scan may continue (at 532). When a Cat-M cell is found (at 536), the UE may proceed to camp on the cell (at 538).

Figure 6:
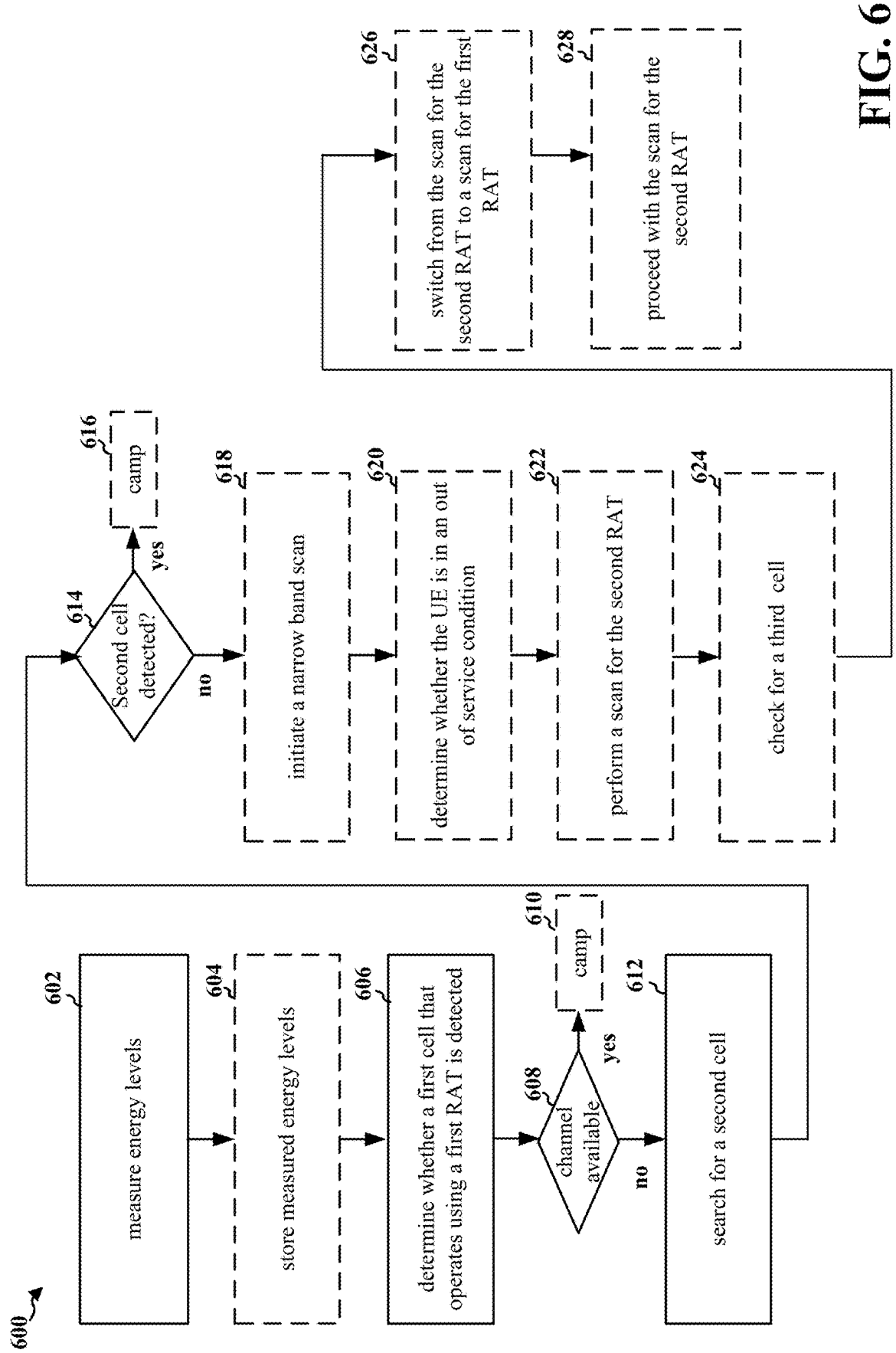
FIG. 6 is a flowchart of a method of wireless communication.

FIG. 6 is a flowchart 600 of a method of wireless communication. The method may be performed by a UE (e.g., the UE, the apparatus 702/702'). Optional aspects are illustrated with a dashed line. The method enables a UE that is capable of using multiple RATs to find a cell in a more time and power efficient manner.

At 602, the UE measures energy levels for each frequency channel of a set of frequency channels in a frequency band to determine measured energy levels. Measuring the energy levels for each frequency channel of the set of frequency channels in the frequency band may include scanning the frequency band and computing an energy level for each frequency channel of the set of frequency channels in the frequency band.

At 604, the UE may store the measured energy levels, e.g., storing the measured energy levels for each frequency channel of the set of frequency channels in the frequency band that meet a threshold, e.g., as described in connection with 406.

Accordingly, the UE may search for the second cell using the measured energy levels that are stored by the UE, as described in connection with any of the aspects of FIGS. 4 and 5. For example, values representing the measured energy levels for each frequency channel of the set of frequency channels in the frequency band that meet a threshold may be stored to a memory, such as RAM or other storage devices or components. The measured energy levels for each frequency channel of the set of frequency channels in the frequency band may be compared to a threshold to determine if the measured energy levels should be stored. The comparison may be performed within measurement component 706, store component 714 of FIG. 7, or some combination of these or other components.

At 606, the UE determines whether a first cell that operates using a first RAT is detected on a frequency channel of the set of frequency channels based on the measured energy levels. Determining whether a first cell is detected may include determining whether an active frequency channel is available using the measured energy levels, e.g., using the measurements at 602, which may be made by measurement component 706 of FIG. 7. For example, the first RAT may comprise Cat-M, and the UE may determine whether a Cat-M cell is detected, as described in connection with 408 and/or 506.

At 608, for example, the UE determines when the active frequency channel is available. The UE may determine whether a Cat-M frequency channel is available, e.g., in connection with the determination performed at 606. For example, the determination may be based on the measurements at 602. The determination may be based on the stored version (604) of the measurements at 602.

At 610, the UE camps on the active frequency channel when the active frequency channel is determined to be available. For example, when the active frequency channel is determined to be available based on the measurements at 602 camping may occur, e.g., as described in connection with 410, 412, and/or 508. As discussed above, the determination may be based on the stored version (604) of the measurements at 602. Accordingly, the camping may be based on the measurements at 602 or the stored version (604) of the measurements at 602.

At 612, the UE searches for a second cell that operates using a second RAT when no cell for the first RAT is detected on the set of frequency channels, e.g., at 606/608. The UE searches for the second cell using the measured energy levels. For example, the search may be based on the measurements at 602 or the stored version (604) of the measurements at 602. Searching for a second cell operating using the second RAT may include scanning each frequency channel having a measured energy level stored by the UE, e.g., as described in connection with 414, 416, 512, or 524.

The first RAT may include a Cat-M RAT, and the second RAT may include NB-IoT. In another example, the first RAT may include NB-IoT and the second RAT may include Cat-M. The first RAT may be an LTE RAT.

At 614, the UE attempts to detect the second cell using the measured energy levels. Thus, 614 illustrates the UE determining whether the second cell is detected, which may be performed in connection with the search for the second cell, at 612. For example, the detection may be based on the measurements at 602 or the stored version (604) of the measurements at 602.

At 616, the UE camps on the second cell when the second cell is detected using the measured energy levels. For example, when the second cell is detected using the measured energy levels, e.g., the measurements at 602 or the stored versions (604) camping may occur, such as described in connection with 420 or 530.

At 618, the UE may initiate a narrowband band scan when the second cell is not detected, at 612/614, using the measured energy levels. For example, when the measured energy levels do not result in a detection of a second cell that operates using a second RAT, the UE may proceed to perform a narrowband band scan, such as described in connection with 422, 516, 532.

At 620, the UE determines whether the UE is in an out of service condition based on the energy levels measured for each frequency channel of the set of frequency channels across the frequency band. As described in connection with 510 in FIG. 5, the UE may determine whether energy across bands has a flat spectrum, e.g., for a short period. The flat spectrum may indicate that the UE is in an out of service condition.

At 622, the UE performs a scan for the second RAT. The UE may perform the scan, e.g., to attempt to detect a second cell using the second RAT. FIG. 5 illustrates the UE performing a narrowband scan at 512 and 524. The example of FIG. 5 illustrates different example aspects that the UE may perform based on the determination at 620, as to whether the UE in in an out of service condition.

At 624, when energy is detected on a particular frequency channel during the scan for the second RAT, the UE may check for a third cell operating using the first RAT on the particular frequency channel. The UE may check for the third cell upon measuring the energy of the particular frequency channel and after determining that no cell of the second RAT is detected, e.g., as illustrated at 518 and 534.

At 626, When the UE is determined to be in the out of service condition, the UE may switch from the scan for the second RAT to a scan for the first RAT, e.g., as described in connection with 518 in FIG. 5. Switching from the scan for the second RAT to a scan for the first RAT may be after checking for the third cell on the particular frequency channel, At 628, the UE may proceed with the scan for the second RAT, e.g., such as illustrated at 516, 532. The scan may be after the UE checks for the third cell on a particular frequency, e.g., at 520, 536. Checking for the third cell on the particular frequency may be based on a finding of sufficient energy, e.g., the measured energy meeting a threshold value. The finding of sufficient energy may be based on the measured energy levels. The scan for the second RAT may be performed when the UE is not in the short OOS condition.

Figure 7:
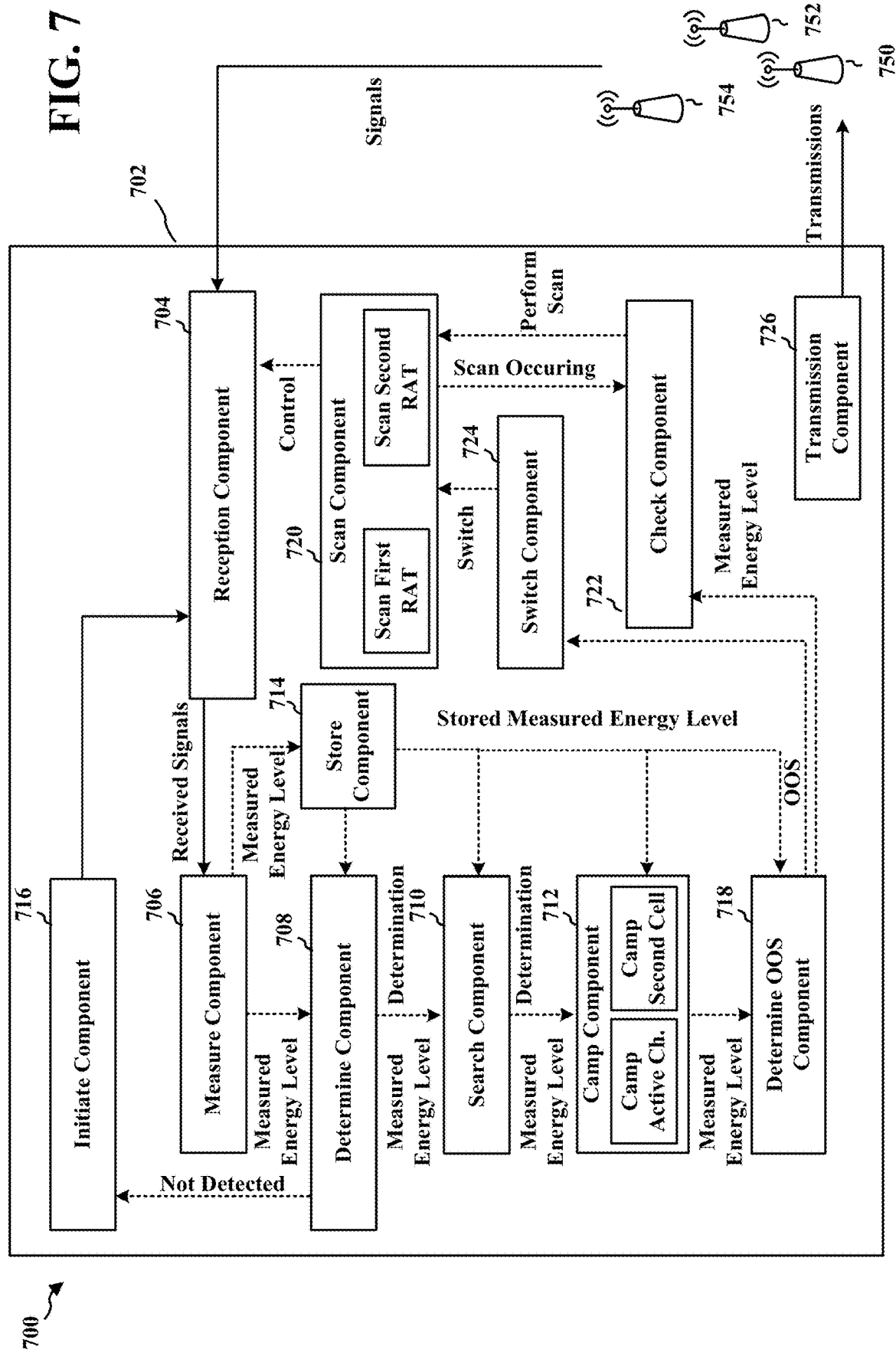
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE. The apparatus includes a reception component 704 that receives signals from one or more base stations 750, 752, 754. The apparatus includes a measurement component 706 that measures energy levels of the received signals, e.g., such as in 602. The apparatus includes a determination component 708 that attempts to detect a first cell (e.g., base station 750 of FIG. 7) that operates using a first RAT based on the measured energy level, e.g., as described in connection with 606, 608. The apparatus includes a search component 710 that searches for a second cell (e.g., base station 752 of FIG. 7) that operates using a second RAT (and receives one or more of the measured energy level or the determination), e.g., as in 612, 614. The apparatus includes a camp component 712 that causes camping on the active frequency channel when the active frequency channel is determined to be available (e.g., based on a determination from 708) and/or causes camping on the second cell when the second cell is detected using the measured energy levels, e.g., as in 610, 616. The apparatus includes a store component 714 that stores the measured energy levels for each frequency channel of the set of frequency channels in the frequency band that meet a threshold, e.g., as in 604. The apparatus includes an initiate component 716 that initiates a narrowband band scan when the second cell is not detected using the measured energy levels, e.g., as in 618. The apparatus includes a determine OOS component 718 that determines whether the UE is in an out of service (00S), e.g., based on the measured energy level, e.g., as in 620. The apparatus includes a scan component 720 that performs a scan for the second RAT, e.g., as in 622. The apparatus includes a check component 722 that checks for a third cell (e.g., base station 754 of FIG. 7) operating using the first RAT on a particular frequency channel when energy is detected, e.g., as in 624. The apparatus includes a switch component 724 that switches from the scan for the second RAT to a scan for the first RAT when the UE is determined to be in the out of service condition, e.g., as in 626. The apparatus includes a transmission component 726 that transmits signals.

The apparatus may include additional components that perform each of the blocks of the algorithm in the aforementioned flowcharts of FIGS. 4-6. As such, each block in the aforementioned flowcharts of FIGS. 4-6 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
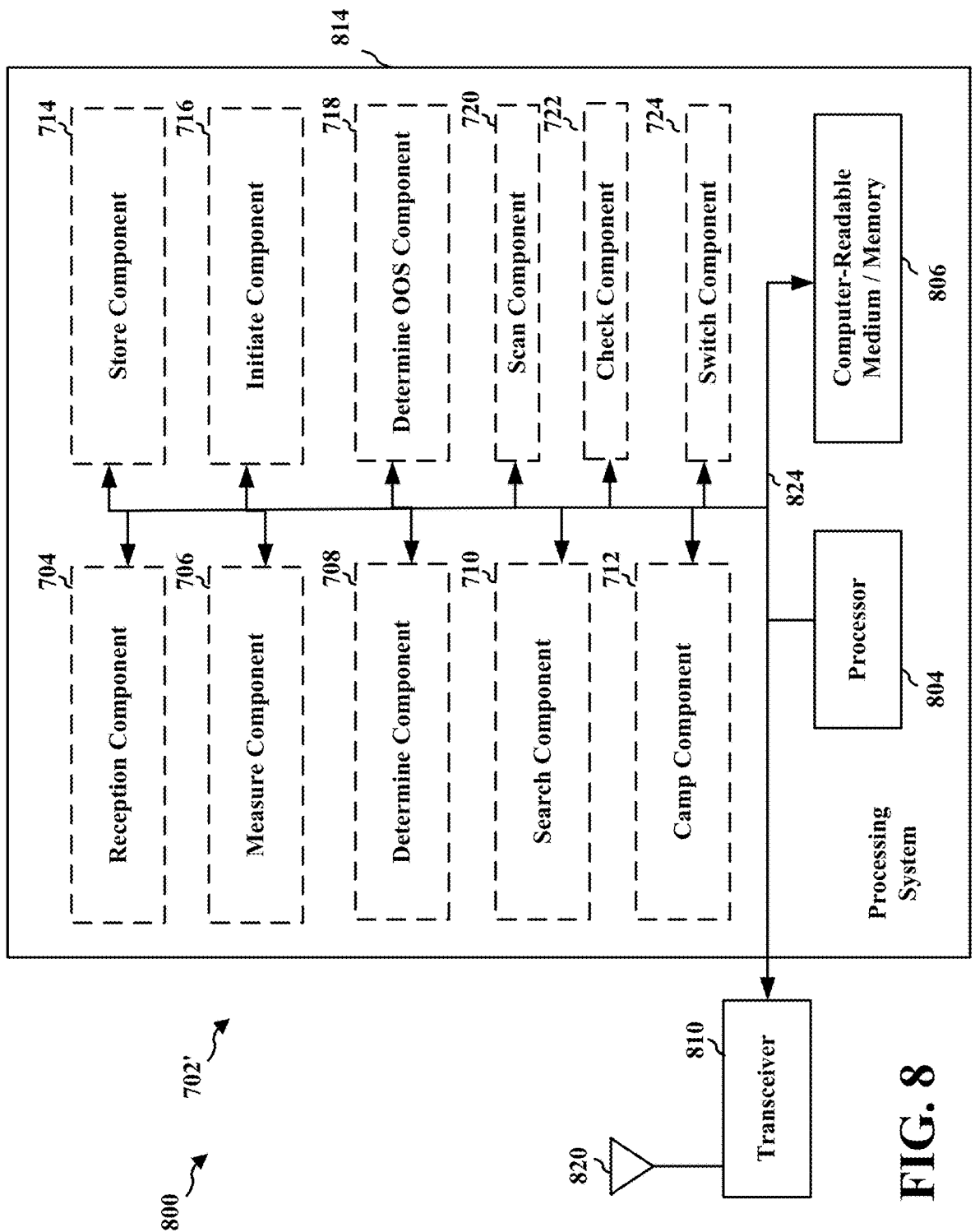
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, 722, 724, 726, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 726, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720, 722, 724, 726. The components may be software components running in the processor 804, resident/stored in the computer-readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for means for measuring energy levels for each frequency channel of a set of frequency channels in a frequency band to determine measured energy levels; means for determining whether a first cell that operates using a first RAT is detected on a frequency channel of the set of frequency channels based on the measured energy levels; means for searching for a second cell that operates using a second RAT, when no cell for the first RAT is detected on the set of frequency channels, wherein the UE searches for the second cell using the measured energy levels; means for camping on the active frequency channel when the active frequency channel is determined to be available; means for storing the measured energy levels for each frequency channel of the set of frequency channels in the frequency band that meet a threshold, wherein the UE searches for the second cell using the measured energy levels that are stored by the UE; means for camping on the second cell when the second cell is detected using the measured energy levels; means for initiating a narrowband band scan when the second cell is not detected using the measured energy levels; means for determining whether the UE is in an out of service condition based on the energy levels measured for each frequency channel of the set of frequency channels across the frequency band; means for performing a scan for the second RAT; means for checking for a third cell operating using the first RAT on a particular frequency channel when energy is detected on the particular frequency channel during the scan for the second RAT; means for switching from the scan for the second RAT to a scan for the first RAT after checking for the third cell on the particular frequency channel, when the UE is determined to be in the out of service condition; means for proceeding with the scan for the second RAT after checking for the third cell on a particular frequency where sufficient energy was found based on the measured energy levels, when the UE in the out of service condition is not determined to be in a short-time out of service condition. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
    measuring energy levels for each frequency channel of a set of frequency channels in a frequency band to determine measured energy levels and storing the measured energy levels for each frequency channel of the set of frequency channels in the frequency band that meet a threshold;
    determining whether a first cell that operates using a first Radio Access Technology (RAT) is detected on a frequency channel of the set of frequency channels based on the measured energy levels;
    searching for a second cell that operates using a second RAT, when no cell for the first RAT is detected on the set of frequency channels, wherein the UE searches for the second cell using the measured energy levels that are stored by the UE; and
    camping on the second cell when the second cell is detected using the measured energy levels.

2. The method of claim 1, wherein measuring the energy levels for each frequency channel of the set of frequency channels in the frequency band comprises scanning the frequency band and computing an energy level for each frequency channel of the set of frequency channels in the frequency band.

3. The method of claim 1, wherein the first cell is detected when the UE determines an active frequency channel is available at the first cell using the measured energy levels.

4. The method of claim 3, further comprising:
    camping on the active frequency channel when the active frequency channel is determined to be available.

5. The method of claim 1, wherein searching for the second cell operating using the second RAT comprises scanning each frequency channel having a measured energy level stored by the UE.

6. The method of claim 1, further comprising:
    initiating a narrowband band scan when the second cell is not detected using the measured energy levels.

7. The method of claim 1, further comprising:
    determining whether the UE is in an out of service condition based on the energy levels measured for each frequency channel of the set of frequency channels across the frequency band;
    performing a scan for the second RAT; and
    checking for a third cell operating using the first RAT on a particular frequency channel when energy is detected on the particular frequency channel during the scan for the second RAT.

8. The method of claim 7, wherein the UE checks for the third cell upon measuring the energy of the particular frequency channel and after determining that no cell of the second RAT is detected.

9. The method of claim 7, further comprising:
    switching from the scan for the second RAT to a scan for the first RAT after checking for the third cell on the particular frequency channel, when the UE is determined to be in the out of service condition.

10. The method of claim 7, further comprising:
    proceeding with the scan for the second RAT after checking for the third cell on the particular frequency where sufficient energy was found based on the measured energy levels, when the UE in the out of service condition is not determined to be in a short-time out of service condition.

11. The method of claim 1, wherein the first RAT comprises Category M (Cat-M) and the second RAT comprises narrowband internet of things (NB-IoT) or wherein the first RAT comprises NB-IoT and the second RAT comprises Cat-M.

12. The method of claim 1, wherein the first RAT comprises a Long Term Evolution (LTE) RAT.

13. An apparatus for wireless communication, comprising:
    means for measuring energy levels for each frequency channel of a set of frequency channels in a frequency band to determine measured energy levels and for storing the measured energy levels for each frequency channel of the set of frequency channels in the frequency band that meet a threshold;

means for determining whether a first cell that operates using a first Radio Access Technology (RAT) is detected on a frequency channel of the set of frequency channels based on the measured energy levels;

means for searching for a second cell that operates using a second RAT, when no cell for the first RAT is detected on the set of frequency channels, wherein the second cell is searched using the stored measured energy levels; and means for camping on the second cell when the second cell is detected using the measured energy levels.

14. The apparatus of claim 13, wherein measuring the energy levels for each frequency channel of the set of frequency channels in the frequency band comprises scanning the frequency band and computing an energy level for each frequency channel of the set of frequency channels in the frequency band.

15. The apparatus of claim 13, wherein the first cell is detected when the UE determines an active frequency channel is available at the first cell using the measured energy levels.

16. The apparatus of claim 15, further comprising:
means for camping on the active frequency channel when the active frequency channel is determined to be available.

17. The apparatus of claim 13, wherein searching for the second cell operating using the second RAT comprises scanning each frequency channel having a measured energy level.

18. The apparatus of claim 13, further comprising:
means for initiating a narrowband band scan when the second cell is not detected using the measured energy levels.

19. The apparatus of claim 13, further comprising:
means for determining whether the UE is in an out of service condition based on the energy levels measured for each frequency channel of the set of frequency channels across the frequency band;
means for performing a scan for the second RAT; and
means for checking for a third cell operating using the first RAT on a particular frequency channel when energy is detected on the particular frequency channel during the scan for the second RAT.

20. The apparatus of claim 19, wherein the UE checks for the third cell upon measuring the energy of the particular frequency channel and after determining that no cell of the second RAT is detected.

21. The apparatus of claim 19, further comprising:
means for switching from the scan for the second RAT to a scan for the first RAT after checking for the third cell on the particular frequency channel, when the UE is determined to be in the out of service condition.

22. The apparatus of claim 19, further comprising:
means for proceeding with the scan for the second RAT after checking for the third cell on the particular frequency where sufficient energy was found based on the measured energy levels, when the UE in the out of service condition is not determined to be in a short-time out of service condition.

23. The apparatus of claim 13, wherein the first RAT comprises Category M (Cat-M) and the second RAT comprises narrowband internet of things (NB-IoT) or wherein the first RAT comprises NB-IoT and the second RAT comprises Cat-M.

24. The apparatus of claim 13, wherein the first RAT comprises a Long Term Evolution (LTE) RAT.

25. An apparatus for wireless communication, comprising:
a memory; and
at least one processor coupled to the memory and configured to:
measure energy levels for each frequency channel of a set of frequency channels in a frequency band to determine measured energy levels and store the measured energy levels for each frequency channel of the set of frequency channels in the frequency band that meet a threshold;
determine whether a first cell that operates using a first Radio Access Technology (RAT) is detected on a frequency channel of the set of frequency channels based on the measured energy levels;
search for a second cell that operates using a second RAT, when no cell for the first RAT is detected on the set of frequency channels, wherein the second cell is searched using the stored measured energy levels; and
camp on the second cell when the second cell is detected using the measured energy levels.

26. The apparatus of claim 25, wherein measuring the energy levels for each frequency channel of the set of frequency channels in the frequency band comprises scanning the frequency band and computing an energy level for each frequency channel of the set of frequency channels in the frequency band.

27. The apparatus of claim 25, wherein the first cell is detected when the UE determines an active frequency channel is available at the first cell using the measured energy levels.

28. The apparatus of claim 27, further comprising:
camp on the active frequency channel when the active frequency channel is determined to be available.

29. The apparatus of claim 25, wherein searching for the second cell operating using the second RAT comprises scanning each frequency channel having a measured energy level.

30. The apparatus of claim 25, further comprising:
initiate a narrowband band scan when the second cell is not detected using the measured energy levels.

31. The apparatus of claim 25, further comprising:
determine whether the UE is in an out of service condition based on the energy levels measured for each frequency channel of the set of frequency channels across the frequency band;
perform a scan for the second RAT; and
check for a third cell operating using the first RAT on a particular frequency channel when energy is detected on the particular frequency channel during the scan for the second RAT.

32. The apparatus of claim 31, wherein the UE checks for the third cell upon measuring the energy of the particular frequency channel and after determining that no cell of the second RAT is detected.

33. The apparatus of claim 31, further comprising:
switch from the scan for the second RAT to a scan for the first RAT after checking for the third cell on the particular frequency channel, when the UE is determined to be in the out of service condition.

34. The apparatus of claim 31, further comprising:
proceed with the scan for the second RAT after checking for the third cell on the particular frequency where sufficient energy was found based on the measured energy levels, when the UE in the out of service condition is not determined to be in a short-time out of service condition.

35. The apparatus of claim 25, wherein the first RAT comprises Category M (Cat-M) and the second RAT comprises narrowband internet of things (NB-IoT) or wherein the first RAT comprises NB-IoT and the second RAT comprises Cat-M.

36. The apparatus of claim 25, wherein the first RAT comprises a Long Term Evolution (LTE) RAT.

37. A computer-readable medium storing computer executable code, the code when executed by a processor cause the processor to:

measure energy levels for each frequency channel of a set of frequency channels in a frequency band to determine measured energy levels and store the measured energy levels for each frequency channel of the set of frequency channels in the frequency band that meet a threshold;

determine whether a first cell that operates using a first Radio Access Technology (RAT) is detected on a frequency channel of the set of frequency channels based on the measured energy levels;

search for a second cell that operates using a second RAT, when no cell for the first RAT is detected on the set of frequency channels, wherein the second cell is searched using the stored measured energy levels; and camp on the second cell when the second cell is detected using the measured energy levels.

\* \* \* \* \*